(12) United States Patent
Chaudri

(10) Patent No.: US 7,533,118 B2
(45) Date of Patent: May 12, 2009

(54) INVESTMENT DATABASE APPLICATION

(75) Inventor: Bikramjit Singh Chaudri, Jersey City, NJ (US)

(73) Assignee: Morgan Stanley, New York, NY (US)

( * ) Notice: Subject to any disclaimer, the term of this patent is extended or adjusted under 35 U.S.C. 154(b) by 0 days.

(21) Appl. No.: 11/020,405

(22) Filed: Dec. 23, 2004

(65) Prior Publication Data

US 2005/0187969 A1 Aug. 25, 2005

Related U.S. Application Data

(60) Provisional application No. 60/532,471, filed on Dec. 24, 2003.

(51) Int. Cl.
*G06F 17/30* (2006.01)

(52) U.S. Cl. .................. 707/102; 707/10; 707/200; 707/3

(58) Field of Classification Search .............. 707/10, 707/3, 200, 204–205; 715/500, 523
See application file for complete search history.

(56) References Cited

U.S. PATENT DOCUMENTS

| 6,078,901 | A |   | 6/2000  | Ching |
| 6,105,012 | A | * | 8/2000  | Chang et al. ............ 705/64 |
| 6,292,788 | B1 |  | 9/2001  | Roberts et al. |
| 6,438,594 | B1 |  | 8/2002  | Bowman-Amuah |
| 6,615,253 | B1 |  | 9/2003  | Bowman-Amuah |
| 6,694,309 | B2 | * | 2/2004  | Cho et al. ............ 707/3 |
| 2001/0034733 | A1 |  | 10/2001 | Prompt et al. |
| 2002/0049624 | A1 |  | 4/2002  | Raveis, Jr. |
| 2002/0091871 | A1 |  | 7/2002  | Cahill et al. |
| 2002/0129054 | A1 | * | 9/2002  | Ferguson et al. ......... 707/503 |
| 2002/0138527 | A1 | * | 9/2002  | Bell et al. ............ 707/530 |
| 2002/0169799 | A1 | * | 11/2002 | Voshell ............ 707/503 |
| 2002/0188629 | A1 | * | 12/2002 | Burfoot ............ 707/503 |
| 2003/0004763 | A1 | * | 1/2003  | LaBlanc et al. ............ 705/7 |
| 2003/0126136 | A1 |  | 7/2003  | Omoigul |
| 2003/0187756 | A1 |  | 10/2003 | Klivington et al. |
| 2004/0070613 | A1 | * | 4/2004  | Sprague et al. ............ 345/762 |
| 2004/0230508 | A1 | * | 11/2004 | Minnis et al. ............ 705/35 |
| 2006/0117251 | A1 | * | 6/2006  | Rothschiller et al. ....... 715/513 |

\* cited by examiner

*Primary Examiner*—Cam Y T Truong
(74) *Attorney, Agent, or Firm*—K&L Gates LLP

(57) ABSTRACT

An investment database application is configured to perform a download process and an upload process. During the download process, the investment database application creates a spreadsheet out of a customized spreadsheet template, receives XML data from a database on a server system, converts the XML data, loads the spreadsheet with the converted data, and saves the populated spreadsheet template to a location specified by the user. During the upload process, the investment database application may convert a populated spreadsheet template created during the download process into an XML formatted file and transmit the XML file to a secure server system that loads the XML data into a Relational Database Management System (RDMS).

12 Claims, 13 Drawing Sheets

INVESTMENT DATABASE APPLICATION

This application claims the priority benefit of U.S. Provisional Application No. 60/532,471, which was filed on Dec. 24, 2003 and is incorporated by reference in its entirety.

TECHNICAL FIELD

The present invention relates generally to systems and methods for analyzing and reporting data and, more particularly, to systems and methods for maintaining data representing investments and tracking financial data relating to investments.

BACKGROUND

Historically, data relating to core business processes, such as an Annual and Quarterly Business Plan, Asset Tracking, Operations Pages, and Debt and Hedging was maintained in spreadsheets (e.g., Microsoft® Excel spreadsheets). One spreadsheet was used for each process for each investment. The spreadsheets were loaded manually with supporting data and mailed to the responsible individuals around the world. Data would be input manually into these sheets and then sent back to a main office.

SUMMARY

In one general aspect, the investment database application is configured to automate the process of entering data into an electronic spreadsheet and to consolidate distributed data in a relational database.

In various embodiments, the investment database application is configured to perform a download process and an upload process. During the download process, the investment database application creates a spreadsheet out of a customized spreadsheet template, receives XML data from a database on a server system, converts the XML data, loads the spreadsheet with the converted data, and saves the populated spreadsheet template to a location specified by the user. During the upload process, the investment database application may convert a populated spreadsheet template created during the download process into an XML formatted file and transmit the XML file to a secure server system that loads the XML data into a Relational Database Management System (RDMS).

Aspects of the present invention may be implemented by a computer system and/or by a computer program stored on a computer readable medium. The computer readable medium may comprise a disk, a device, and/or a propagated signal.

Other features and advantages will be apparent from the following description, including the drawings, and from the claims.

DESCRIPTION OF THE DRAWINGS

FIGS. 4-15 illustrate exemplary user interfaces according to one embodiment of the present invention.

DETAILED DESCRIPTION

In various embodiments, systems and methods maintain data representing investments and track financial data relating to investments. For simplicity, the basic components of such systems and methods are provided. However, as would be understood by one of ordinary skill in the art, the systems and methods described below may include various other structures and/or processes in actual implementation.

Figure 1:
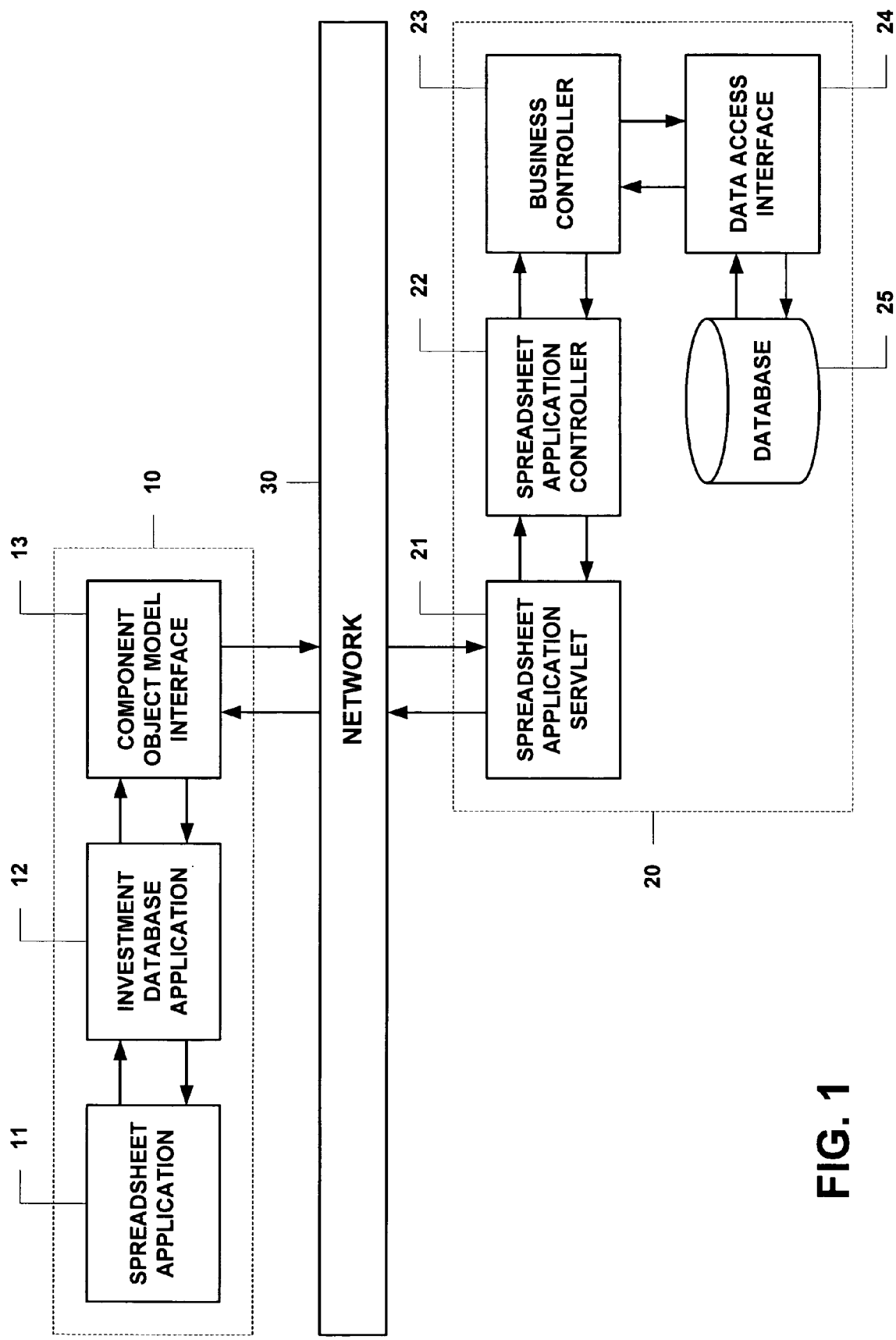
FIG. 1 illustrates a communications system according to one embodiment the present invention.

FIG. 1 illustrates one embodiment of a communications system in which aspects of the present invention may be used. In various implementations, the communications system may be configured to maintain data representing investments and track financial data relating to investments.

As shown, the communications system includes a client system 10 and a server system 20. In general, the client system 10 is configured to present information to and receive information from a user, and the server system 20 is configured to provide a set of resources for one or more users. The client system 10 and server system 20 each may include one more computing devices capable of responding to and executing instructions. Examples of computing devices include, but are not limited to, personal computers, workstations, laptop computers, network-enabled personal digital assistants, network-enabled telephones, servers (e.g., Unix operating system servers, Linux operating system-based servers, IBM® operating system servers, Windows NT™ servers, Sybase servers), microprocessors, integrated circuits, or combination thereof.

In various embodiments, the client system 10 and server system 20 each may include one or more programs for independently or collectively instructing the client system 10 and/or server system 20 to interact and operate. Examples of programs include, but are not limited to, computer programs, software applications, operating systems, computer codes, sets of instructions, plug-in applications, or combination thereof. Such programs may be implemented in conjunction with various operating systems and utilize any suitable computer language (e.g., C, C++, Java, JavaScript, Visual Basic, VBScript, Visual Basic for Applications, Delphi).

A program may be stored on a computer-readable medium such that when a computer reads the medium, the functions described herein are performed. The term computer-readable medium as used herein may include, for example, magnetic and optical memory devices such as diskettes, compact discs of both read-only and writeable varieties, optical disk drives, and hard disk drives. A computer-readable medium also may include memory storage that can be physical, virtual, permanent, temporary, semi-permanent and/or semi-temporary. A computer-readable medium may further include one or more data signals transmitted on one or more carrier waves In various embodiments, the client system 10 is connected to the server system 20 through a network 30. The client system 10 and the server system 20 each may include hardware and/or software components for communicating with the network 30 and with each other. The client system 10 and server 20 may be structured and arranged to communicate through the network 30 using various communication protocols (e.g., HTTP, HTTPS, TCP/IP, UDP, WAP, WiFi, Bluetooth) and/or to operate within or in concert with one or more other communications systems.

The network 30 may include any type of delivery system including, but not limited to a local area network (e.g., Ethernet), a wide area network (e.g. the Internet and/or World Wide Web), a telephone network (e.g., analog, digital, wired, wireless, PSTN, ISDN, and/or XDSL), a packet-switched network, a radio network, a television network, a cable network, a satellite network, and/or any other wired or wireless communications network configured to carry data. The network 30 may include elements, such as, for example, firewalls, intermediate nodes, proxy servers, routers, switches, and adapters configured to direct and/or deliver data.

As depicted in FIG. 1, the client system 10 includes a spreadsheet application 11, and investment database application 12, and a Component Object Model (COM) interface 13. In various embodiments, the spreadsheet application 11, investment database application 12, and the COM interface 13 may be implemented by computer programming executed by the client system 10.

In one embodiment, the spreadsheet application 11 is configured to generate an electronic spreadsheet or grid having columns and rows of cells for receiving data. In general, the spreadsheet application 11 allows a user to enter data into the cells and utilize various formulas or functions (e.g., sum, average, max, min, etc.) to manipulate the data. One example of a commercially available spreadsheet application is Microsoft® Excel.

In various implementations, the investment database application 12 is configured to automate the process of entering data into an electronic spreadsheet and to consolidate distributed data in a relational database. In one embodiment, the investment database application 12 is configured to operate in conjunction with the spreadsheet application 11. Upon installation, for example, the investment database application 12 may display a menu option in the tools menu bar of the spreadsheet application 11.

In general, the investment database application is designed to upload and download data from the server system 20 without the user leaving (e.g., exiting or toggling) from the spreadsheet application 11. In one embodiment, the investment database application 12 is implemented using Visual Basic for Applications (VBA) macros, collects data in XML format, and uses XML for data transfer.

In various embodiments, the investment database application 12 is configured to perform a download process and an upload process. During the download process, the investment database application 12 creates a spreadsheet out of a customized spreadsheet template, receives XML data from a database 25 on the server system 20, converts the XML data, loads the spreadsheet with the converted data, and saves the populated spreadsheet template to a location specified by the user. During the upload process, the investment database application 12 converts a populated spreadsheet template created during the download process into an XML formatted file and transmits the XML file over HTTPS to a secure website where the XML data is loaded into a Relational Database Management System (RDMS).

In one embodiment, the investment database application 12 can be configured from inside of the spreadsheet application 11 to communicate with a particular server system 20 (e.g., production server, UAT server, DEV server, etc.) that supports the investment database application 12. The investment database application 12 may be configured to communicate with a particular server system 20 by manipulating a text file, for example.

In general, the investment database application 12 may be used for a variety of business processes. For instance, in one implementation, the investment database application 12 may be used to maintain and/or track financial data related to realty investments. The investment database application 12 may be used, for example, to maintain and/or track financial data related to one or more of: a Business Plan process, an Asset Tracking process, an Operations Pages process, and a Debt and Hedging Schedules process.

In various implementations, the architecture of the investment database application 12 may be template-based so that new business processes can be integrated by creating a new business process template. A new template can be created, for example, based on specified rules that enable the investment database application 12 to recognize the custom template. In such embodiments, only the spreadsheet template needs to be customized to the business process. Customization of the overall investment database application 12 is not necessary.

In one embodiment, spreadsheet templates are customized for each business process to enable downloading data from and uploading data to the server system 20. Each business process may require a custom spreadsheet template (e.g., business plan template, asset tracking template, operations pages template, debt and hedging schedules template) to maintain and/or track financial data relating to investments. In various implementations, the spreadsheet templates may be customized based on the specifications of one or more of: a Real Estate Private Equity Group, a Real Estate Fund Controllers, and Real Estate Investment Controller.

In one embodiment, the custom spreadsheet templates may include named ranges that can be parsed by the investment database application 12. The investment database application 12 may be configured to extract data out of the named ranges and populate XML data from any type of template. In various implementations, the investment database application 12 parses spreadsheet cells as named ranges and generates XML formatted data.

In various embodiments, the investment database application 12 is configured to provide secure communications between the client system 10 and the server system 20. In one implementation, the investment database application 12 prompts the use to enter authentication data such as a user ID and password. The authentication data (e.g., user ID and password) may be required for access to one or more components of the server system 20.

As shown in FIG. 1, in one embodiment, the investment database application 12 communicates with the server system 20 through a COM interface 13. In general, the COM interface 13 is configured to enable communication between the client system 10 and the server system 20 and may be used to transfer data by linking software components on the client system 10 with software components on the server system 20.

In one implementation, the COM interface 13 is built using Visual C++. A custom dynamic link library (DLL) may be deployed on the client system 10. The DLL may wrap an Internet application programming interface (API) enabling posting using standard protocols generally used for web technologies (e.g., HTTP, HTTPS). In some secure environments, HTTPS is automatically supported.

In various embodiments, the investment database application 12 and the COM interface 13 enable the transfer of data between the spreadsheet application 11 and the database 25 housed on the server system 20 (e.g., Unix platform) through the Network 30 (e.g., World Wide Web). In various implementations, XML is used as the data transport medium between the server system 20 and the spreadsheet application 11.

In various embodiments, the COM interface 13 is used to post data from the investment database application 12 to the server system 20. For example, in some implementations, data cannot be directly posted from the spreadsheet application 11 (e.g., Microsoft® Excel application) to the server system 20 (e.g., Unix server). In such implementations, the COM interface 13 enables posting of XML data to a designated server system 20 and processes responses from the server system 20.

In various embodiments, the COM interface 13 receives the authentication data from the investment database application 12 and sends the authentication data to the server system 20 to request access. Such requests may be posted to the server system 20 using standard protocols (e.g., http, https).

Referring to FIG. 1, in one embodiment, the server system 20 includes a spreadsheet application servlet 21, a spreadsheet application controller 22, a business controller 23, a data access interface 24, and a database 25.

In various implementations, the spreadsheet application servlet 21 and the spreadsheet application controller 22 may be standard access interfaces associated with the spreadsheet application 11. In one embodiment, the spreadsheet application servlet 21 and the spreadsheet application controller 22 may be configured to route a request for financial data to a particular business controller 23 (e.g., Java servlet) upon receiving a request for financial data.

In various implementations, the business controller 23 may include logic specific to the to the particular business process of the selected spreadsheet template. In one embodiment, the business controller 23 may be configured to validate and parse financial data based on the specifications of a particular business process. Examples of business processes include, but are not limited to: a Business Plan process, an Asset Tracking process, an Operations Pages process, and a Debt and Hedging Schedules process.

In various embodiments, the business controller 23 may be configured to dynamically generate a list of fund information in response to a download request. In one implementation, the list of fund information may include fund and investment information such as, for example: a list of fund information, associated investments, and/or a reporting period.

In various embodiments, the server system 20 may include a data access interface 24 for providing access to the database 25 to authenticated users. In one implementation, the server system may be configured to use one or more authentication techniques (e.g., Kerberos authentication, BigDog authentication) for ensuring secure communications.

The business controller 23 may be configured to request download of financial data through the data access interface 24 from the information database 25 (e.g., Sybase database). In various implementations, financial data is provided from the database 25 through the data access interface 24 to the business controller 23. In one embodiment, the business controller 23 is configured to generate a snapshot of the financial data existing on the database 25 so that the exact same financial data will be received by the investments database application 12. The business controller may be configured to send XML formatted financial data through the network 30 to the COM interface 13 at the client system 10.

The business controller 23 may be configured to request upload of financial data through the data access interface 24 to the information database 25 (e.g., Sybase database). In various implementations, the business controller 23, upon validation, may upload financial data (e.g., XML formatted data) through the data access interface 24 to the information database 25 (e.g., Sybase database).

In various embodiments, the business controller 23 may be configured to send a response to the client system 10 that the financial data has been successfully uploaded or downloaded. In one implementation, the confirmation response may include XML formatted data configured to generate a popup window on the client system 10 informing the user of a successful upload or download.

Figure 2:
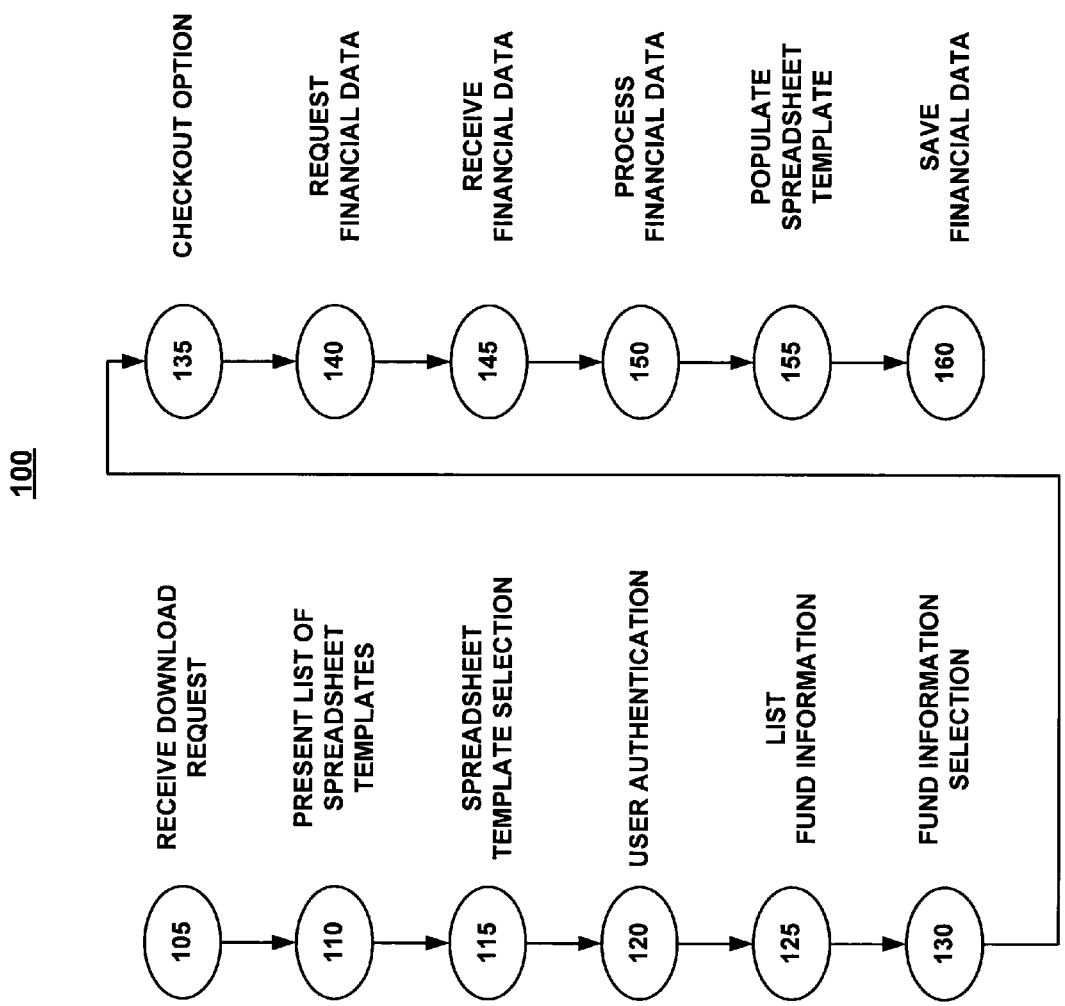
FIG. 2 illustrates a method according to one embodiment the present invention.

FIG. 2 illustrates one embodiment of a method 100 for performing a download process in accordance with aspects of the present invention. The method 100 may be implemented by any suitable type of hardware (e.g., device, computer, computer system, equipment, component); software (e.g., program, application, instruction set, code); storage medium (e.g., disk, device, propagated signal); or combination thereof.

In one implementation, the method 100 may involve creating a spreadsheet from a selected spreadsheet template, receiving XML data from a database 25 on the server system 20, converting the XML data, loading the spreadsheet with the converted data, and saving the populated spreadsheet template to a location specified by the user.

At step 105, a download request is received. In various implementations, the client system 10 receives a download request from a user. In one embodiment, the user initiates a download process by selecting a download option from a menu displayed by the client system 10. The download option may be included within a menu displayed by the spreadsheet application 11 (e.g., Microsoft® Excel).

At step 110, a list of spreadsheet templates is presented. In various implementations, the client system 10 presents a list of spreadsheet templates to a user. In one embodiment, each of the listed spreadsheet templates corresponds to a particular business process (e.g., business plan template, asset tracking template, operations pages template, debt and hedging schedules template). The spreadsheet templates may be customized based on the specifications of one or more of: a Real Estate Private Equity Group, a Real Estate Fund Controllers, and Real Estate Investment Controller to maintain and/or track financial data relating to investments.

At step 115, spreadsheet template selection is received. In various implementations, the investment database application 12 receives input from the user corresponding to a selected spreadsheet template. In one embodiment, the user selects a spreadsheet template corresponding to particular business process (e.g., business plan process, asset tracking process, operations pages process, debt and hedging schedules process).

In general, a selected spreadsheet may be rendered by the client system 10 and populated with financial data downloaded from the server system 20. The spreadsheet templates may include named ranges that can be parsed by the investment database application 12, and the investment database application 12 may be configured to parse spreadsheet shells as name ranges, extract data out of the named ranges, receive XML formatted data, and populate the spreadsheet template.

At step 120, authentication of the user is performed. In various implementations, the client system 10 and the server system 20 provide secure communications across a network 30. In one embodiment, the user is prompted by the client system 10 to enter a user ID and password required by the server system 20 to access the database 25 and download financial data. The server system 20 may include a data access interface 24 for providing access to the database 25 to authenticated users. The server system 20 may employ one or more authentication techniques (e.g., Kerberos authentication, BigDog authentication) for ensuring secure communications.

In various implementations, the user may be presented with a disclaimer. In general, the disclaimer may request the user to acknowledge permissible uses of the software and financial data.

At step 125, a list of fund information available for download is presented. In various implementations, the client system 10 presents a list of fund information available for download to a user. In general, the fund information may be related to a particular business process (e.g., business plan process, asset tracking process, operations pages process, debt and hedging schedules process). Selected fund information may be used to populate a particular spreadsheet template (e.g., business plan template, asset tracking template, operations pages template, debt and hedging schedules template) associated with the particular business process.

In various implementations, the list of fund information may include fund and investment information such as, for example: a list of fund information, associated investments, and/or a reporting period. The list of fund information may be dynamically generated by the server system 20 so that it is current as of the time of the download request. In one embodiment, the list of fund information is generated by the investment database application 12 at the client system 10 in response to downloaded XML data sent by the server system 20.

At step 130, a selection of fund information is received. In various implementations, the client system 10 receives a selection from the user of particular fund information for download. In one embodiment, the item is selected by the user from the list of fund information available for download.

At step 135, a checkout option is received. In various implementations, the client system 10 presents the user with an option to "checkout" or lock out other users. Upon selection of the checkout option, downloaded data will be locked for edit to ensure that only one user can change the financial data at a give time.

At step 140, financial data is requested. In various implementations, the investment database application 12 requests financial data from the server system 20. In one embodiment, the investment database application 12 generates a data request for financial information according to the fund information selected by the user. The data request for financial data, in turn, may be sent by the COM interface 13 across the network 30 to the server system 20. The data request may be formatted using standard protocols (e.g., http, https) that are not specific to any language and are capable of being received and responded to by the server system 20 (e.g., Java-based web server, IIS-based, ASP-based, Unix-based).

In one embodiment, the server system 20 includes a spreadsheet application servlet 21 and a spreadsheet application controller 22. The spreadsheet application servlet 21 and the spreadsheet application controller 22 may be standard access interfaces associated with the spreadsheet application 11. Upon receiving the data request for financial data, the spreadsheet application servlet 21 and the spreadsheet application controller 22 may be configured to route the data request for financial data to a particular business controller 23 (e.g., Java servlet). The business controller 23 may include logic specific to the to the particular business process of the selected spreadsheet template. The business controller 23, in turn, may request retrieval of the financial data through the data access interface 24 from the information database 25 (e.g., Sybase database).

At step 145, financial data is received. In various implementations, the financial data is provided from the database 25 through the data access interface 24 to the business controller 23. In one embodiment, the business controller 23 generates a snapshot of the financial data existing on the database 25 so that the exact same financial data will be received by the investments database application 12. The business controller sends XML formatted financial data through the network 30 to the COM interface 13 at the client system 10. Upon receipt, the COM interface 13 sends the XML formatted financial data to the investment database application 12.

At step 150, the financial data is processed. In various implementations, the investment database application 12 performs processing so that the financial data is compatible with the spreadsheet application 11. In one embodiment, the investment database application 12 converts the financial data from XML format into a format associated with the spreadsheet application 11 (e.g., Excel format).

At step 155, the spreadsheet template is populated with the converted financial data. In various implementations, the investment database application 12 populates a spreadsheet template for a particular business process (e.g., business plan template, asset tracking template, operations pages template, debt and hedging schedules template) with the converted financial data associated with the selected fund information.

At step 160, financial data is saved. In various implementations, the investment database application 12 in conjunction with the spreadsheet application 11 enables the user to save the financial data to a desired destination. In general, the user may save the populated spreadsheet template to a location local to the client system 10.

In various implementations, the user may name and save the populated spreadsheet template as a file associated with the spreadsheet application 11 (e.g., .xls file). In one embodiment, the file may be manipulated offline, so that the user can disconnect, download data, perform processing offline, and then send data back to the server system 20.

Figure 3:
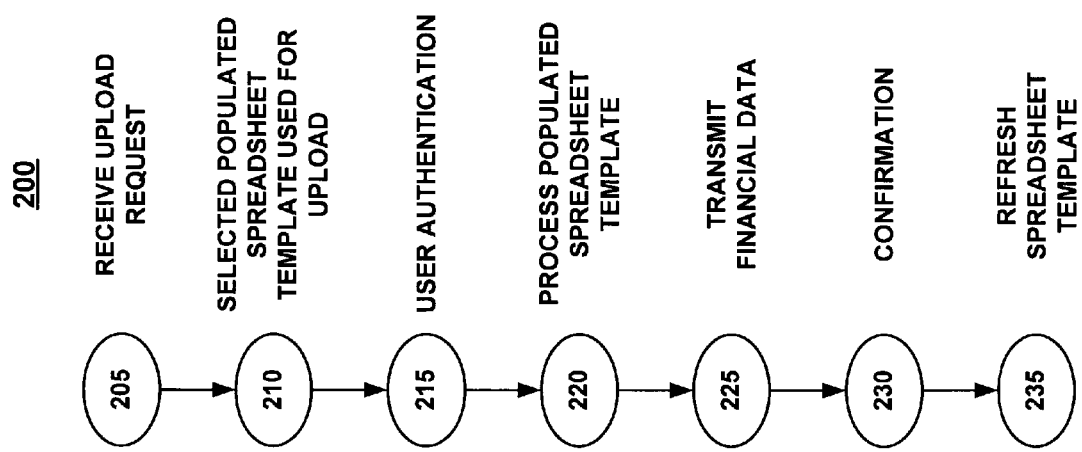
FIG. 3 illustrates a method according to one embodiment the present invention.

FIG. 3 illustrates one embodiment of a method 200 for performing an upload process in accordance with aspects of the present invention. The method 200 may be implemented by any suitable type of hardware (e.g., device, computer, computer system, equipment, component); software (e.g., program, application, instruction set, code); storage medium (e.g., disk, device, propagated signal); or combination thereof.

In one implementation, the method 200 may involve converting a populated spreadsheet template created during the download process into an XML formatted file, transmitting the XML file to a secure server system 20, and loading the XML data into a Relational Database Management System (RDMS).

At step 205, an upload request is received. In various implementations, the client system 10 receives an upload request from a user. In one embodiment, the user initiates an upload process by selecting an upload option from a menu displayed by the client system 10. The upload option may be included within a menu displayed by the spreadsheet application 11 (e.g., Microsoft® Excel).

At step 210, a selected populated spreadsheet template is used for upload. In various implementations, the investment database application 12 receives input from the user confirming that a selected populated spreadsheet is to be uploaded. In one embodiment, the selected spreadsheet template corresponds to particular business process (e.g., business plan process, asset tracking process, operations pages process, debt and hedging schedules process), and the financial data is associated with fund information for the particular business process. The spreadsheet templates may be customized based on the specifications of one or more of: a Real Estate Private Equity Group, a Real Estate Fund Controllers, and Real Estate Investment Controller to maintain and/or track financial data relating to investments.

At step 215, authentication of the user is performed. In various implementations, the client system 10 and the server system 20 provide secure communications across a network 30. In one embodiment, the user is prompted by the client system 10 to enter a user ID and password required by the server system 20 to access the database 25 and upload financial data. The server system 20 may include a data access interface 24 providing access to the database 25 to authenticated users. The server system 20 may employ one or more authentication techniques (e.g., Kerberos authentication, BigDog authentication) for ensuring secure communications.

In various implementations, the user may be presented with a disclaimer. In general, the disclaimer may request the user to acknowledge permissible uses of the software and financial data.

At step 220, the populated spreadsheet template is processed. In various implementations, a populated spreadsheet may include named ranges that can be parsed by the investment database application 12. In one embodiment, the investment database application 12 may be configured to parse spreadsheet cells as name ranges and extract XML data out of the named ranges.

In various implementations, the investment database application 12 may perform processing on the populated spreadsheet so that the extracted financial data is compatible with the server system 20 (e.g., Unix platform). In one embodiment, the investment database application 12 converts the financial data from a format associated with the spreadsheet application 11 (e.g., Excel format) into XML formatted financial data.

At step 225, financial data is transmitted. In various implementations, the investment database application 12 transmits the converted financial data (e.g., XML formatted data) to the server system 20. In one embodiment, the investment database application 12 send the financial data to the COM interface 13. Upon receipt, the COM interface 13 sends the financial data across the network 30 to the server system 20. The financial data may be transmitted by the COM interface 13 using standard protocols (e.g., http, https) that are not specific to any language and are capable of being received and responded to by the server system 20 (e.g., Java-based web server, IIS-based, ASP-based, Unix-based).

In one embodiment, the server system 20 includes a spreadsheet application servlet 21 and a spreadsheet application controller 22. The spreadsheet application servlet 21 and the spreadsheet application controller 22 may be standard access interfaces associated with the spreadsheet application 11. Upon receiving the financial data, the spreadsheet application servlet 21 and the spreadsheet application controller 22 may be configured to route the data request for financial data to a particular business controller 23 (e.g., Java servlet).

In various implementations, the business controller 23 may include logic specific to the to the particular business process of the populated spreadsheet template. In one embodiment, the business controller 23 may validate and parses the financial data based on the specifications of the particular business process. Upon validation, the business controller 23, then may request upload of the financial data through the data access interface 24 to the information database 25 (e.g., Sybase database).

At step 230, confirmation is sent. In various implementations, the business controller sends a response to the client system 10 that the financial data has been successfully loaded. In one embodiment, the confirmation response includes XML formatted data configured to generate a popup window on the client system 10 informing the user of a successful upload.

At step 235, the spreadsheet template is refreshed. In various implementations, the investment database application 12 performs processing so that the financial data is compatible with the spreadsheet application 11. In one embodiment, the investment database application 12 converts the financial data from XML format into a format associated with the spreadsheet application 11 (e.g., Excel format) and refreshes the spreadsheet template.

FIGS. 4-15 illustrate exemplary user interfaces according to one embodiment of the present invention.

Figure 4:
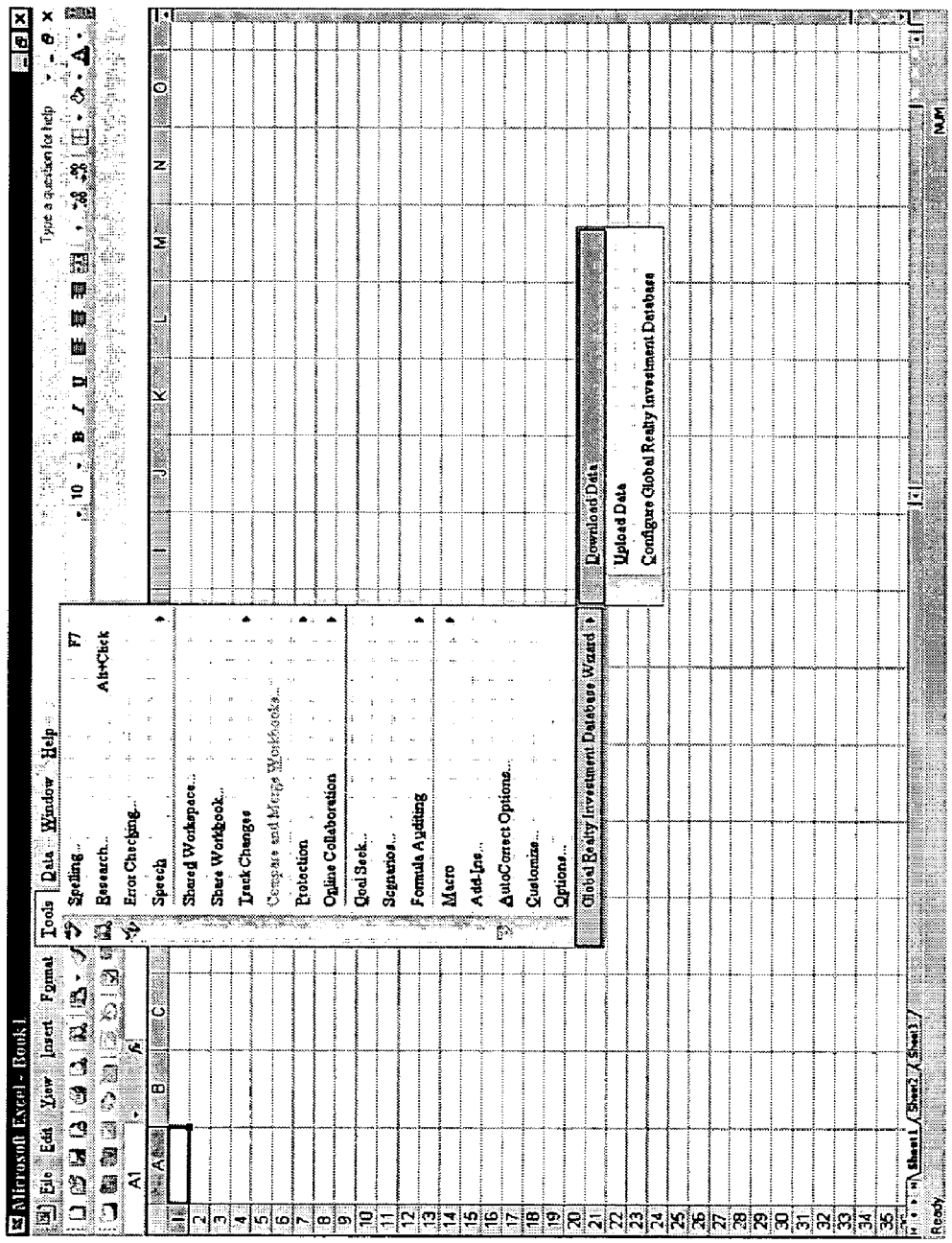
Figure 5:
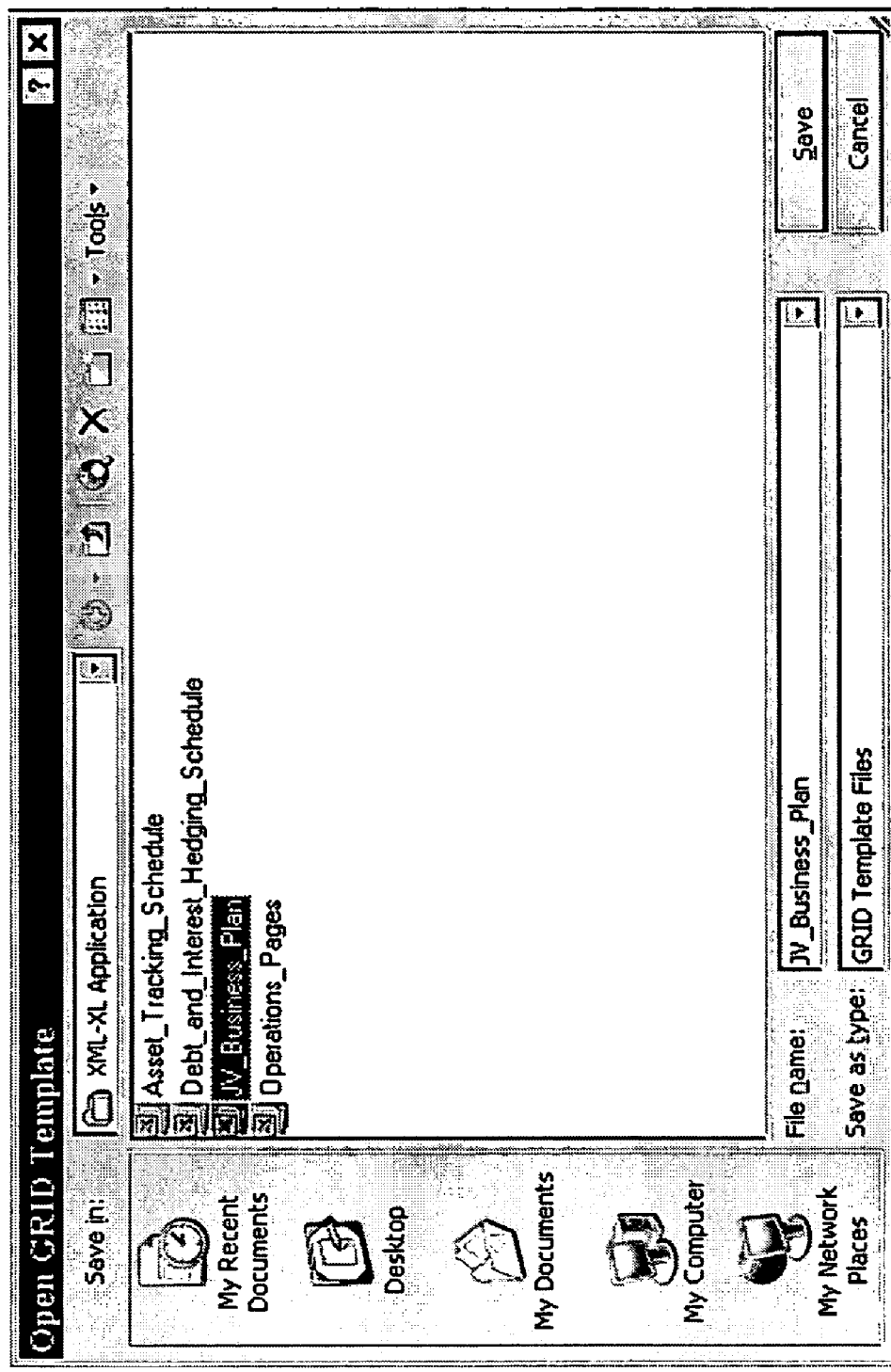
Figure 6:
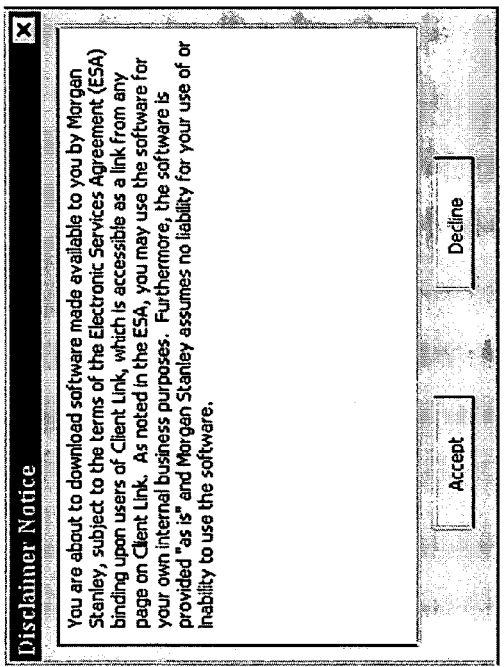
Figure 7:
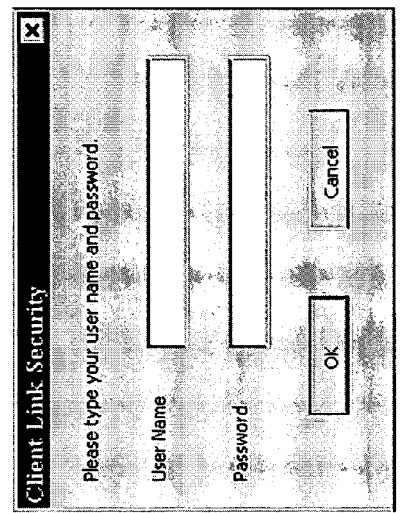
Figure 8:
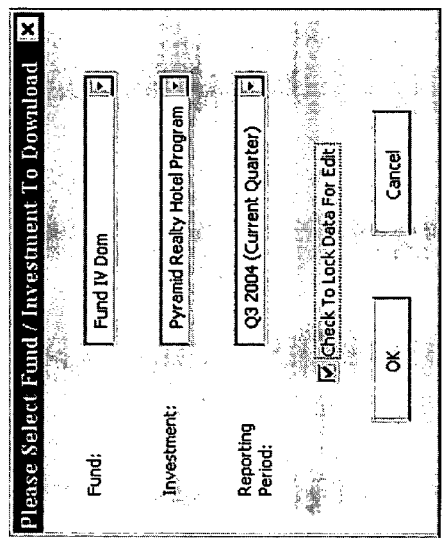
Figure 9:
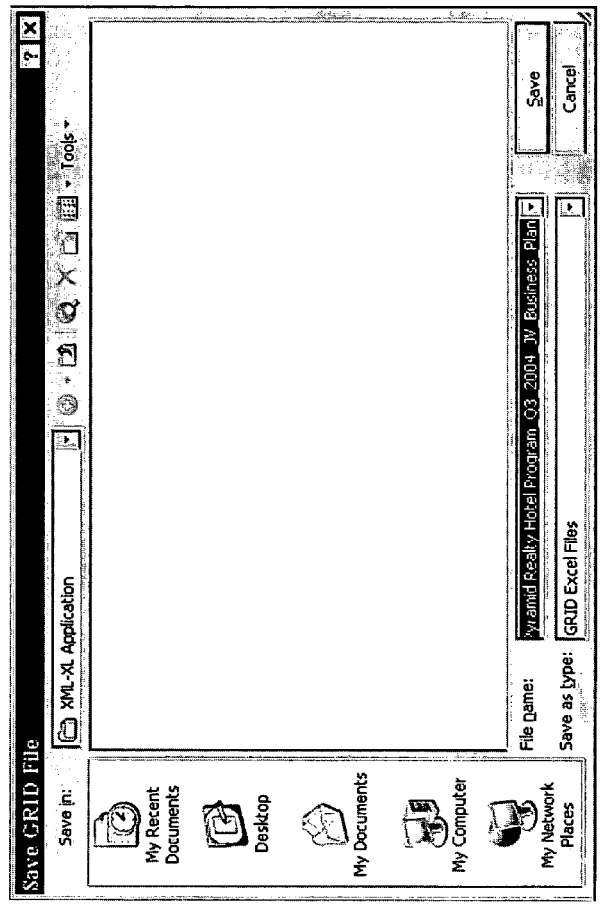
Figure 10:
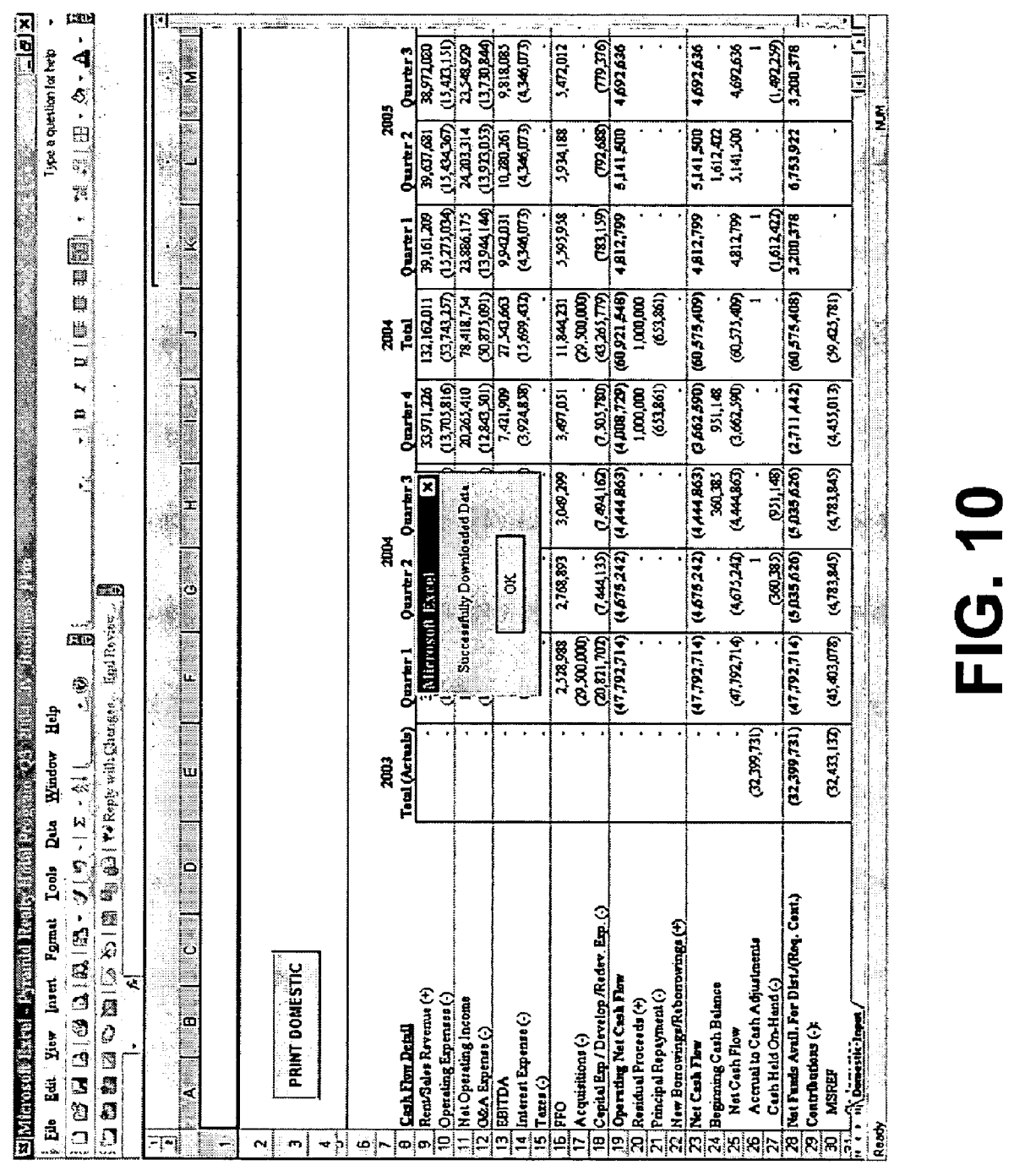

FIG. 4 illustrates an exemplary user interface (UI) that may be displayed to a user for initiating a download request, an upload request, and/or for configuring the investment database application. FIG. 5 illustrates an exemplary UI that may be displayed to a user in response to receiving a download request. FIG. 6 illustrates an exemplary UI for presenting a disclaimer to a user. FIG. 7 illustrates an exemplary UI for prompting a user for authentication information. FIG. 8 illustrates an exemplary UI for selecting a fund and/or investment to download. FIG. 9 illustrates an exemplary UI that may be displayed to a user when receiving financial data. FIG. 10 illustrates an exemplary UI that may be displayed to a user for processing financial data.

Figure 11:
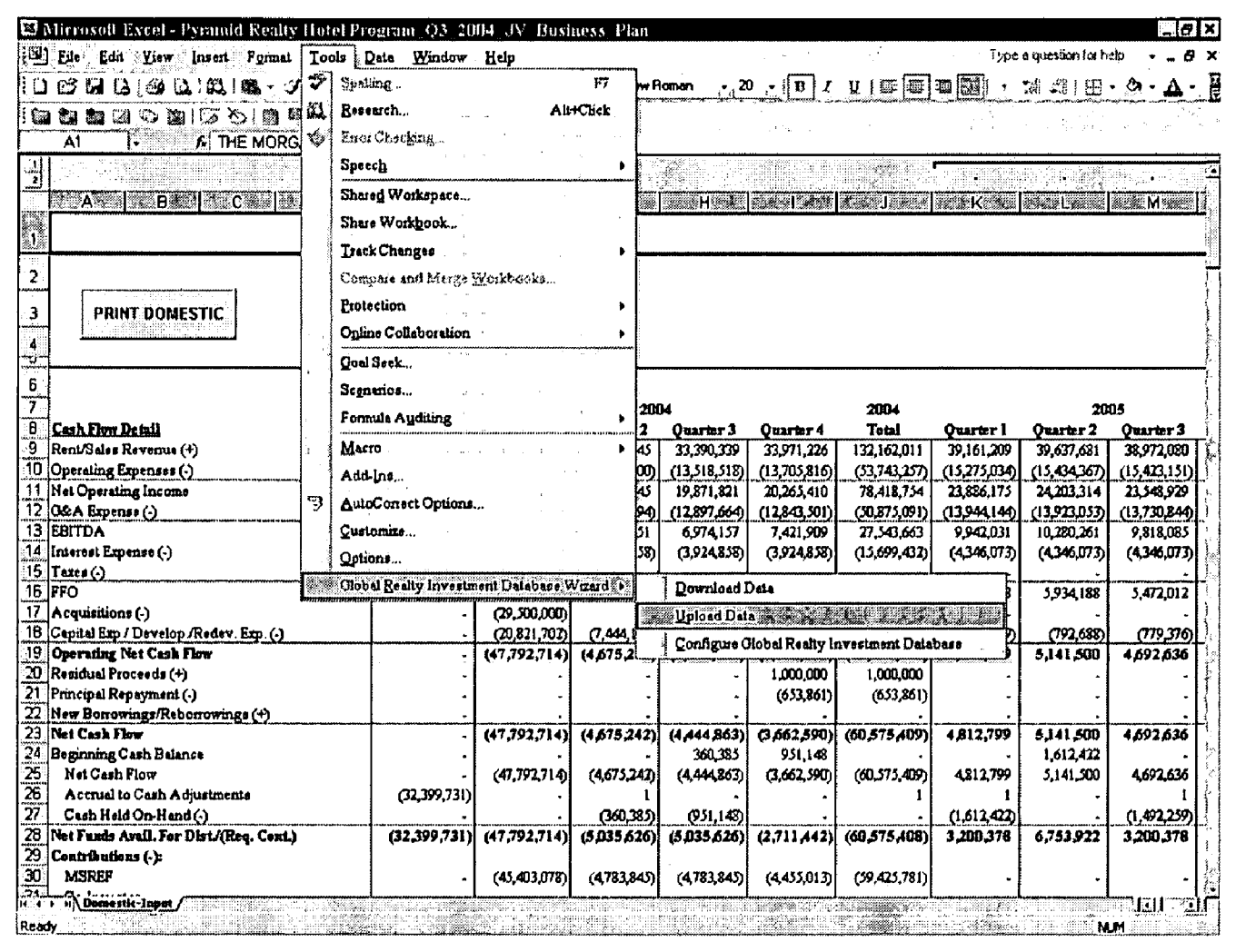
Figure 12:
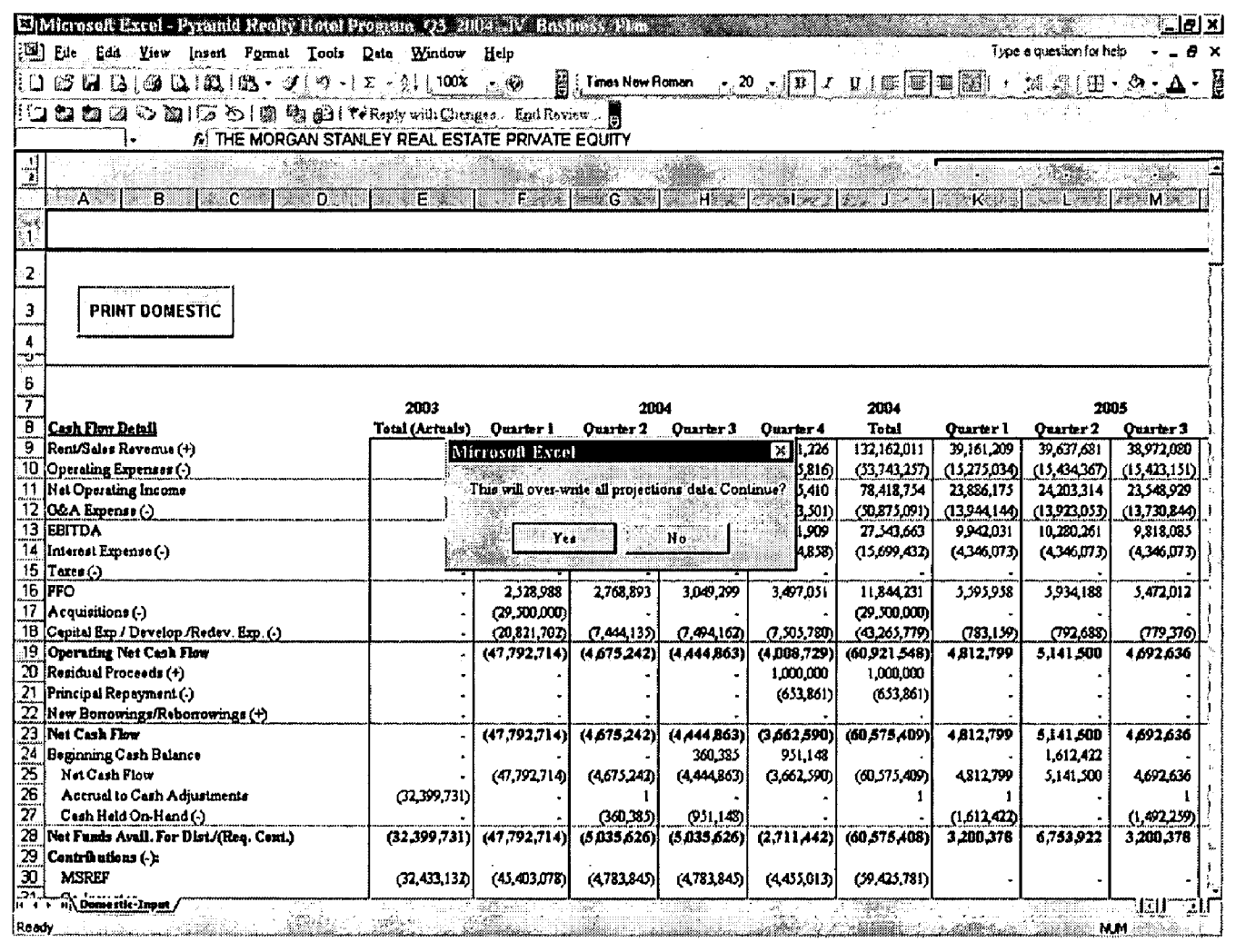
Figure 13:
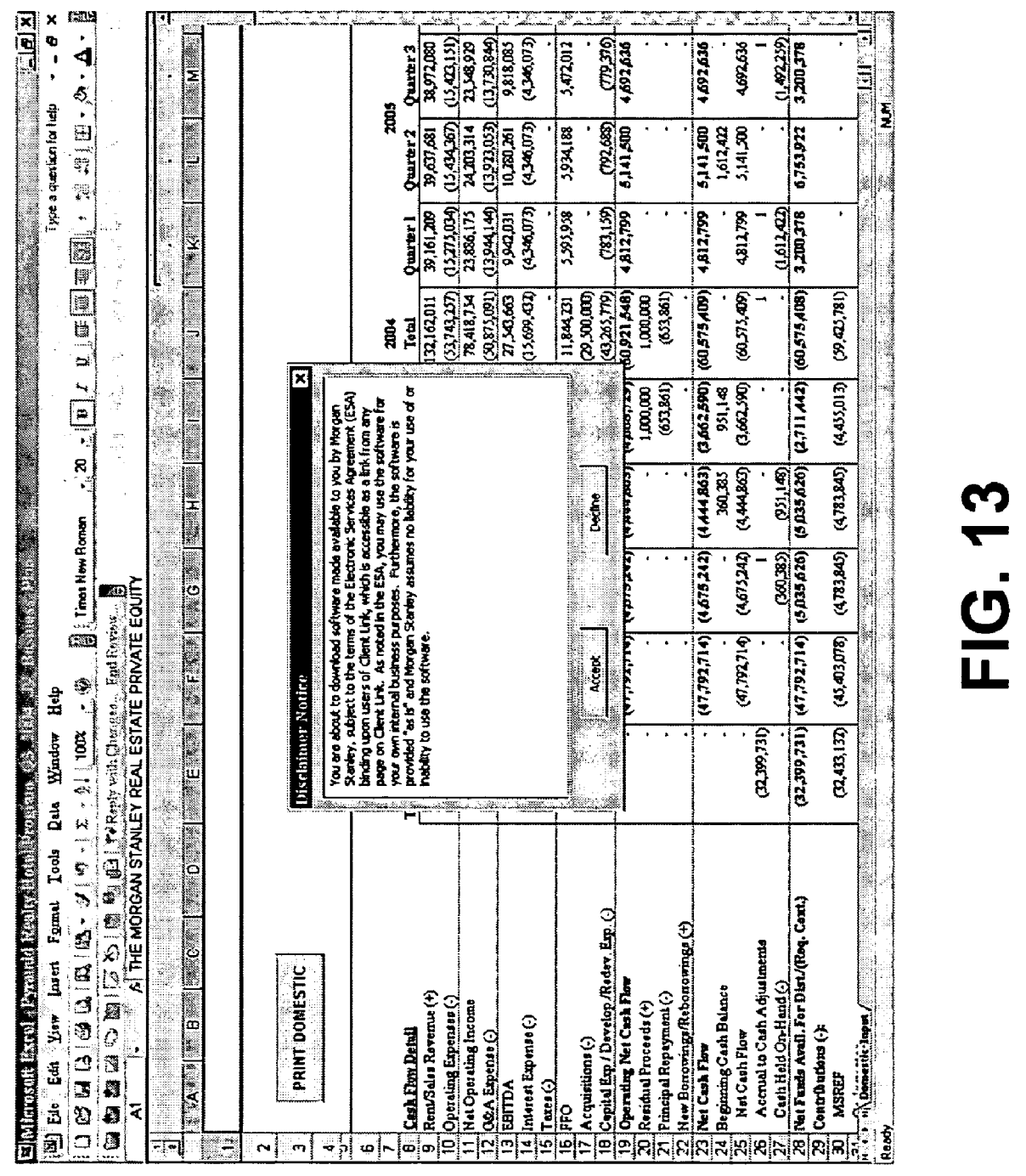
Figure 14:
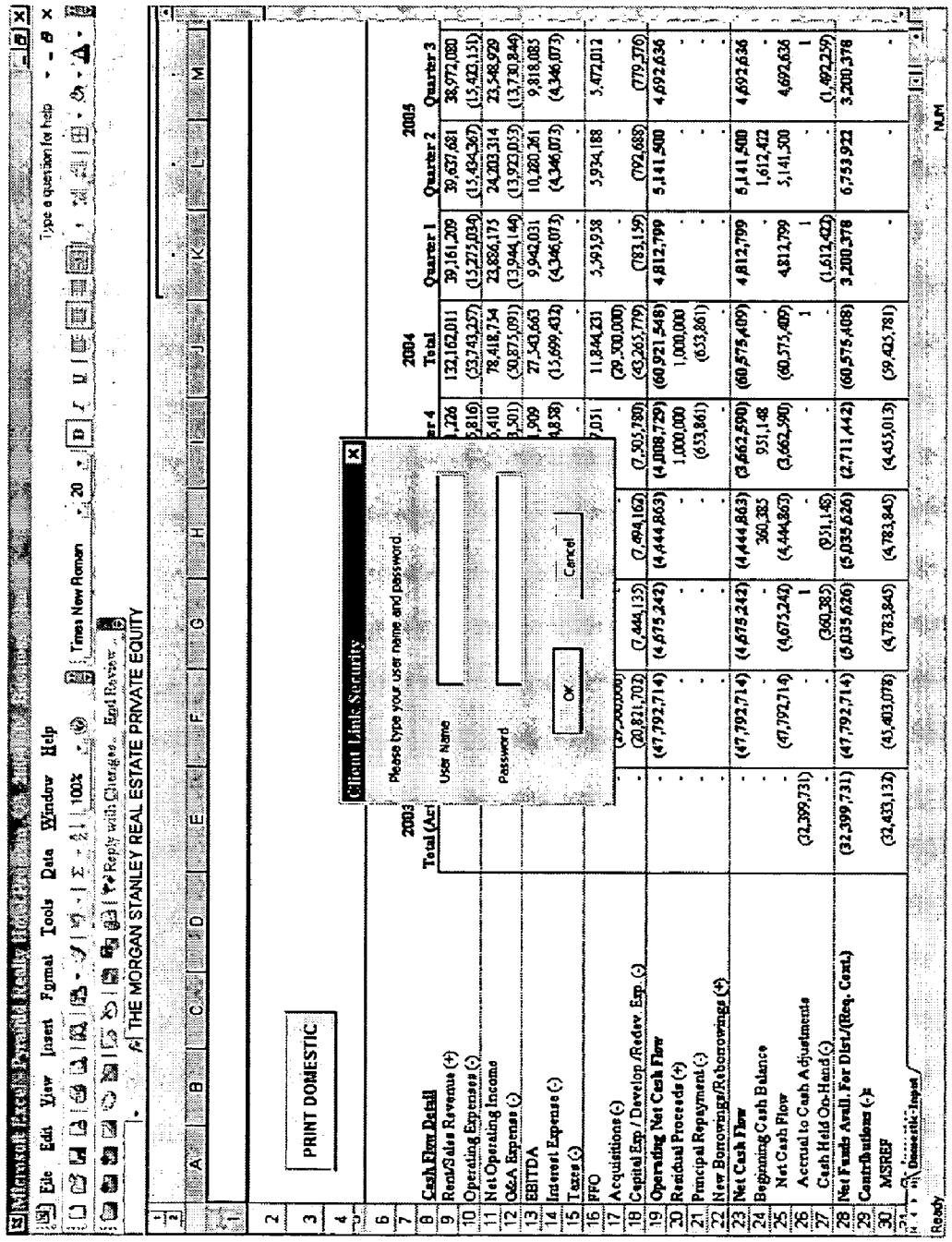
Figure 15:
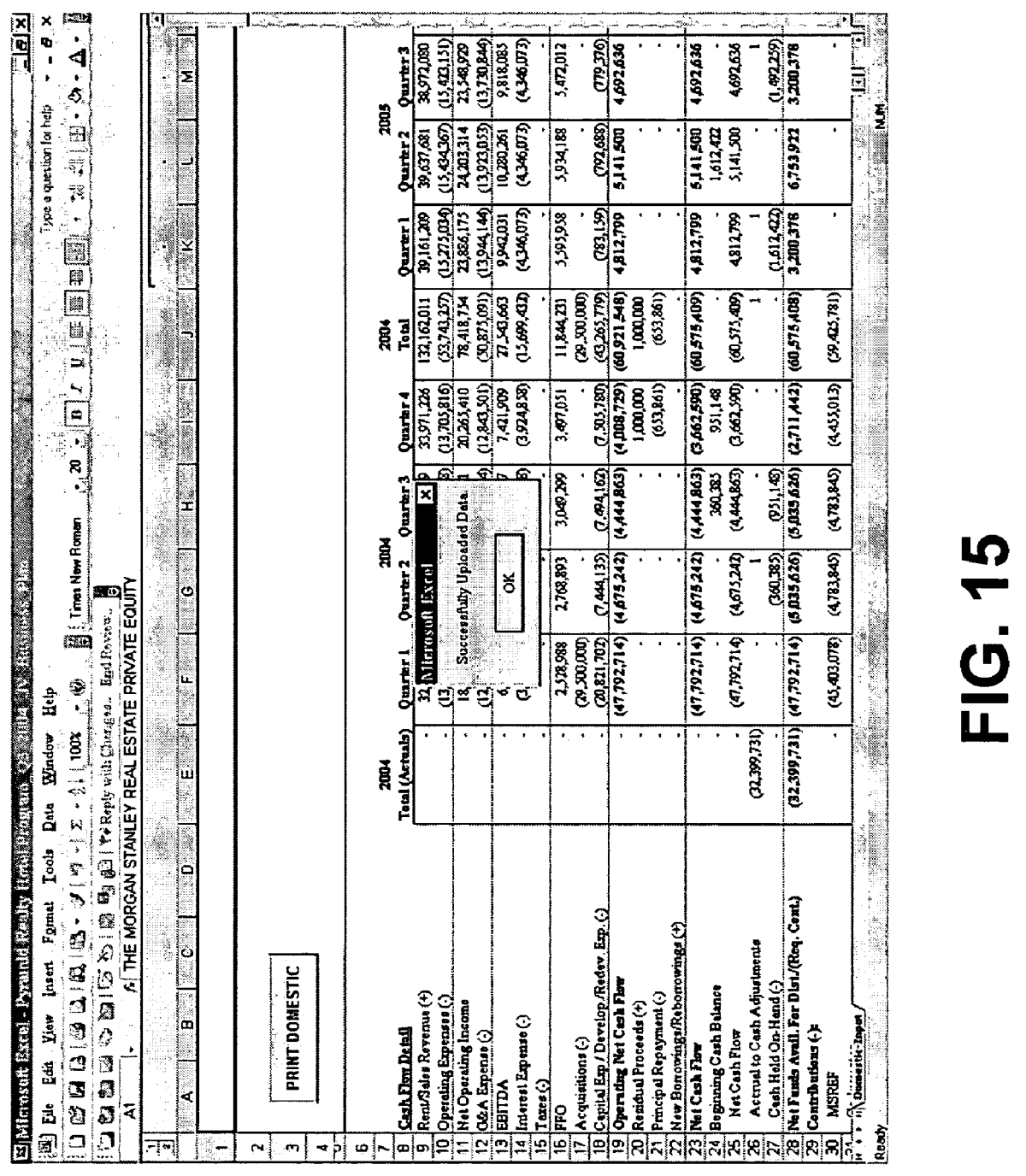

FIG. 11 illustrates an exemplary UI for uploading a populated spreadsheet. FIG. 12 illustrates an exemplary UI for saving a populated spreadsheet. FIG. 13 illustrates an exemplary UI for presenting a disclaimer to a user. FIG. 14 illustrates an exemplary UI for prompting a user for authentication information. FIG. 15 illustrates an exemplary UI for confirming a successful upload of financial data.

While several embodiments of the invention have been described, it should be apparent, however, that various modifications, alterations and adaptations to those embodiments may occur to persons skilled in the art with the attainment of some or all of the advantages of the present invention. For example, while the embodiments described above include a spreadsheet application 11, other applications (e.g., MS Word) may be used with the investment database application 12 and the COM interface 13 consistent with aspects of the present invention. It is therefore intended to cover all such modifications, alterations and adaptations without departing from the scope and spirit of the present invention as defined by the appended claims.

What is claimed is:

1. A system for processing data comprising:
   a client system comprising a computer-readable storage disk;
   a spreadsheet application installed on the client system; and
   an investment database application installed on the client system and in communication with the spreadsheet application;
   wherein the investment database application comprises a download option accessible from the spreadsheet application for downloading a snapshot of data generated by a server system without a user leaving the spreadsheet application;
   wherein the investment database application presents a list of selectable spreadsheet templates, each spreadsheet template having a corresponding business process associated therewith, and said each spreadsheet template comprising named ranges that are parsed by the investment database application;
   wherein the investment database application presents selectable information available for download by the client system, the selectable information relating to the business process of a selected spreadsheet template;
   wherein the investment database application automatically creates an electronic spreadsheet based on the selected spreadsheet template, the electronic spreadsheet rendered by the spreadsheet application;
   wherein the investment database application downloads Extensible Markup Language (XML) formatted data associated with a selected portion of the selectable information from the server system and converts the XML formatted data into spreadsheet formatted data;
   wherein the investment database application automatically populates the electronic spreadsheet with the converted XML formatted data;
   wherein the investment database application converts spreadsheet formatted data from the populated electronic spreadsheet into XML formatted data and transmits the converted spreadsheet formatted data to the server system, the transmitted data to be uploaded to a database of the server system subsequent to validation of the transmitted data by a business controller of the server system, the validation based on a specification of the business process of the selected spreadsheet template; and wherein the investment database application provides an indication when the upload is successful based on a confirmation response received from the server system.

2. The system of claim 1, wherein the business process of the selected spreadsheet template comprises one of: a business plan process, an asset tracking process, an operations pages process, a debt and hedge schedules process.

3. The system of claim 1, wherein the selectable information available for download comprises one or more of: a list of fund information, investments associated with the fund information, and a reporting period.

4. The system of claim 1, wherein the investment database application comprises a plug-in to the spreadsheet application.

5. The system of claim 1, further comprising a component object model interface installed on the client system, the component object model interface configured to transfer data between the client system and the server system through a network.

6. The system of claim 5, wherein the component object model interface communicates with the server system through the network using a standard protocol.

7. The system of claim 1, wherein the
business controller includes logic specific to the business process of the selected spreadsheet template; and
wherein the database is for storing data related to the business process of the selected spreadsheet template.

8. The system of claim 7, wherein the business process of the selected spreadsheet template comprises one of: a business plan process, an asset tracking process, an operations pages process, a debt and hedge schedules process.

9. The system of claim 7, wherein the selectable information available for download comprises a list of fund information dynamically generated by the business controller based on the business process of the selected spreadsheet template.

10. The system of claim 7, wherein the business controller is configured to generate the snapshot of data from data existing on the database.

11. A method for processing data stored in a database of a server system, the method comprising:
presenting a list of selectable spreadsheet templates using an investment database application installed on a client system, the client system comprising a computer-readable storage disk, the investment database application in communication with a spreadsheet application installed on the client system, each spreadsheet template having a corresponding business process associated therewith, and said each spreadsheet template comprising named ranges that are parsed by the investment database application;
presenting selectable information available for download by the client system using the investment database application, the selectable information relating to the business process of a selected spreadsheet template;
automatically creating an electronic spreadsheet based on the selected spreadsheet template using the investment database application, the electronic spreadsheet rendered by the spreadsheet application;
downloading Extensible Markup Language (XML) formatted data associated with a selected portion of the selectable information from the database to the client system and converting the XML formatted data into spreadsheet formatted data using the investment database application, wherein the investment database application comprises a download option accessible from the spreadsheet application for downloading a snapshot of data generated by the server system without a user leaving the spreadsheet application;
automatically populating the electronic spreadsheet with the converted XML formatted data using the investment database application; and
converting spreadsheet formatted data from the populated electronic spreadsheet into XML formatted data and transmitting the converted spreadsheet formatted data to the server system, the transmitted data to be uploaded to the database subsequent to validation of the transmitted data by a business controller of the server system, the validation based on a specification of the business process of the selected spreadsheet template; and
providing an indication when the upload is successful based on a confirmation response received from the server system.

12. A computer-readable storage disk having stored thereon instructions which executed by a computer, cause the computer to:
present a list of selectable spreadsheet templates using an investment database application installed on a client system and in communication with a spreadsheet application installed on the client system, each spreadsheet template having a corresponding business process associated therewith, and said each spreadsheet template comprising named ranges that are parsed by the investment database application;
present selectable information available for download by the client system using the investment database application, the selectable information relating to the business process of a selected spreadsheet template;
automatically create an electronic spreadsheet based on the selected spreadsheet template using the investment database application, the electronic spreadsheet rendered by the spreadsheet application;
download Extensible Markup Language (XML) formatted data associated with a selected portion of the selectable information from a server system to the client system and convert the XML formatted data into a format compatible with the spreadsheet application using the investment database application, wherein the investment database application comprises a download option accessible from the spreadsheet application for downloading a snapshot of data generated by the server system without a user leaving the spreadsheet application;
automatically populate the electronic spreadsheet with the converted XML formatted data using the investment database application; and
convert spreadsheet formatted data from the populated electronic spreadsheet into XML formatted data and transmit the converted spreadsheet formatted data to the server system, the transmitted data to be uploaded to a database of the server system subsequent to validation of the transmitted data by a business controller of the server system, the validation based on a specification of the business process of the selected spreadsheet template; and
provide an indication when the upload is successful based on a confirmation response received from the server system.

* * * * *

UNITED STATES PATENT AND TRADEMARK OFFICE
CERTIFICATE OF CORRECTION

| | | |
|---|---|---|
| PATENT NO. | : 7,533,118 B2 | Page 1 of 1 |
| APPLICATION NO. | : 11/020405 | |
| DATED | : May 12, 2009 | |
| INVENTOR(S) | : Bikramjit Singh Chaudri | |

It is certified that error appears in the above-identified patent and that said Letters Patent is hereby corrected as shown below:

Column 12, line 28, delete "installed on the client system, each spreadsheet" and substitute --installed on the client system, each said spreadsheet--

Signed and Sealed this

Fourth Day of May, 2010

David J. Kappos
*Director of the United States Patent and Trademark Office*